United States Patent [19]

Hashimoto et al.

[11] Patent Number: 4,584,667
[45] Date of Patent: Apr. 22, 1986

[54] WORD CATEGORY SELECTION MEANS FOR ELECTRONIC TRANSLATOR

[75] Inventors: Shintaro Hashimoto, Ikoma; Kunio Yoshida, Nara; Masafumi Morimoto, Yamatokoriyama; Hisao Morinaga, Nara; Shigenobu Yanagiuchi, Tenri, all of Japan

[73] Assignee: Sharp Kabushiki Kaisha, Osaka, Japan

[21] Appl. No.: 357,089

[22] Filed: Mar. 11, 1982

[30] Foreign Application Priority Data

Mar. 12, 1981 [JP] Japan .................................. 56-36158

[51] Int. Cl.$^4$ .............................................. G06F 15/38
[52] U.S. Cl. ..................................... 364/900; 364/419
[58] Field of Search ....................................... 364/900

[56] References Cited

U.S. PATENT DOCUMENTS 4,159,536 6/1979 Kehoe et al. .......................... 364/900
4,339,806 7/1982 Yoshida ................................. 364/900
4,383,306 5/1983 Morimoto et al. .................... 364/900

FOREIGN PATENT DOCUMENTS 2014765 8/1979 United Kingdom .

Primary Examiner—Gareth D. Shaw
Assistant Examiner—John G. Mills
Attorney, Agent, or Firm—Birch, Stewart, Kolasch & Birch

[57] ABSTRACT

An electronic translator is provided wherein a first word or words represented in a first language are entered to obtain a second word or words represented in a second language equivalent to the first word or words. The translator comprises a memory for storing a plurality of words grouped by category, a selection key switch for selecting the category, and an access circuit responsive to the selection key switch for addressing the memory to retrieve and output the plurality of words in the category, each of the plurality of words being outputted by a single operation of the key switch.

7 Claims, 10 Drawing Figures (a) MODE SWITCH→SEN.   ◀ カテゴリーキー ヲ ソウサシテクダサイ ▶

(b)                    ( ◀ TOUCH A CATEGORY KEY ▶ )

(c) 🍴 [▫ro]    ◇

(d)            (バー) ガ アリマスカ

(e) 🍴 [▫ro]   ヨヤク シテイマセン

(f)    [SRC]   (7)ニンヨウノ (テーブル) ガ ホシイ

(g) ◀[ラra]    (ニホンコウクウ)ノ カウンタ ハ ドコデスカ

(h)    [TRC]   WHERE IS THE (JAL) COUNTER.

FIG.5(a)

(i) MODE SWITCH → WD (j) [WD]  ◀ カテゴリーキー ヲ ソウサシテクダサイ ▶

(k) ✈ [ラra]  ヒコウキ

(l) ✈ [ラra]  ジェット

(m) [SRC]  コクサイテキナ

(n) [TRL]  INTERNATIONAL (o) 引例 [シn]  カンコウ (ケンブツ)

FIG.5(b)

WORD CATEGORY SELECTION MEANS FOR ELECTRONIC TRANSLATOR

BACKGROUND OF THE INVENTION

The present invention generally relates to a word information storage and retrieval device, and more particularly to an electronic translator for providing efficient and rapid retrieval of any desired word or words stored therein.

Recently, electronic devices called electronic translators have become available on the market. The electronic translators require efficient and rapid retrieval of word information stored in a memory. For this purpose, conventionally, words and sentences are classified by categories. Each of the words or the sentences that is grouped by categories is outputted by selecting one of the categories. In such a case, when the category in which one of the words or the sentences falls is uncertain, the operation of selecting the categories probably must be repeated.

Therefore, it is desired that a translator suitable for selecting one of the categories be proposed as soon as possible.

SUMMARY OF THE INVENTION

Accordingly, it is an object of the present invention to provide an improved electronic translator suitable for selecting one of categories in which words and sentences are grouped.

It is another object of the present invention to provide an improved electronic translator for outputting each of the words or sentences that is grouped by category by subsequently actuating a category selection key switch.

It is a further object of the present invention to provide an improved electronic translator for selecting each of the words and sentences grouped by category, by actuating a key different from a category selection key switch.

Briefly described, in accordance with the present invention, an electronic translator wherein a first word or words represented in a first language are entered to obtain a second word or words represented in a second language equivalent to the first word or words, comprises memory means for storing a plurality of words grouped by category, selection means for selecting a category, the selection means comprising a key switch, and access means responsive to the selection means for addressing the memory means to retrieve and output the plurality of words in the category, each of the plurality of words being outputted by a single-operation of the key switch.

BRIEF DESCRIPTION OF THE DRAWING

The present invention will become more fully understood from the detailed description given hereinbelow and the accompanying drawing which is given by way of illustration only, and thus is not limitative of the present invention and wherein:

FIGS. 5(a) and 5(b) show a specific combination of selection of a mode switch and category key switches, and display contents according to the present invention;

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
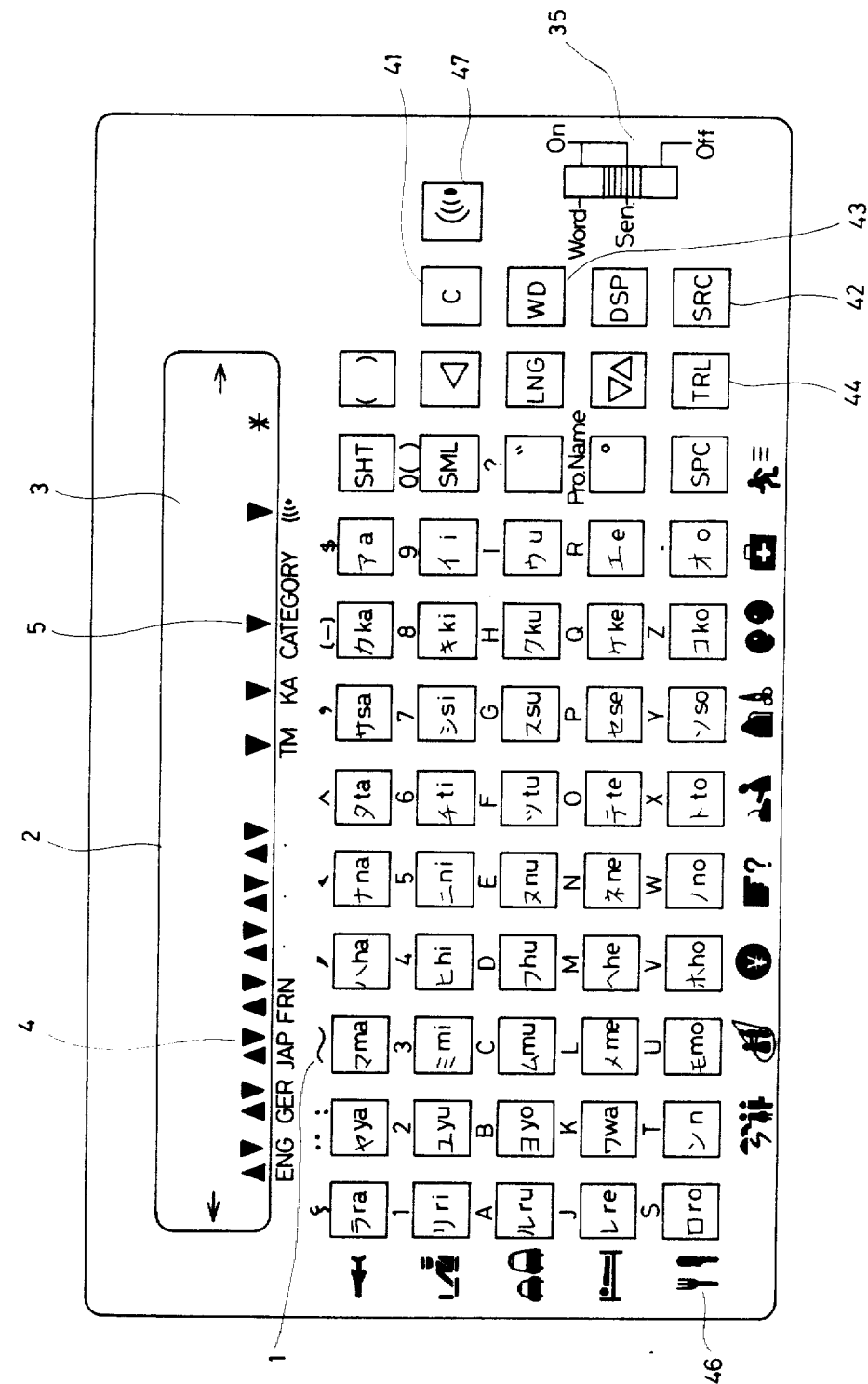
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a kind of tongue indicator 4 and a symbol indicator 5.

The character indicator 3 shows characters processed by this translator. The language indicator 4 shows symbols used for representing the kind of the mother language and the foreign language then being processed by the translator. The symbol indicator 5 shows symbols used for indicating operating conditions in this translator.

The symbol indicator 5 includes symbols illuminated to indicate the selection of a multivocal word, represented by TM, the selection of a Japanese "Katakana" letter, represented by KA, the selection of categories, and the selection of an audible information output.

A mode selector switch 35 is provided for selecting modes of word selection ("Word") and sentence selection ("Sen.") in which the translator is powered. The selector switch 5 can be operated also to turn off the power. As a function key switch, a clear key switch 41 is provided for cancelling word/sentence information. Further, a search key 42, referenced as "SRC", is provided for continually retrieving words and sentences. A word key 43, referred to as "WD" is provided. A translation key 44, referred to as "TRL", is provided to translate the words and the sentences into the selected foreign language.

Category selection key switches are provided which are accompanied and specified by various category symbols 46 in FIG. 1. A pronunciation key 47 is provided for producing an audible representation of the words and the sentences.

Figure 2:
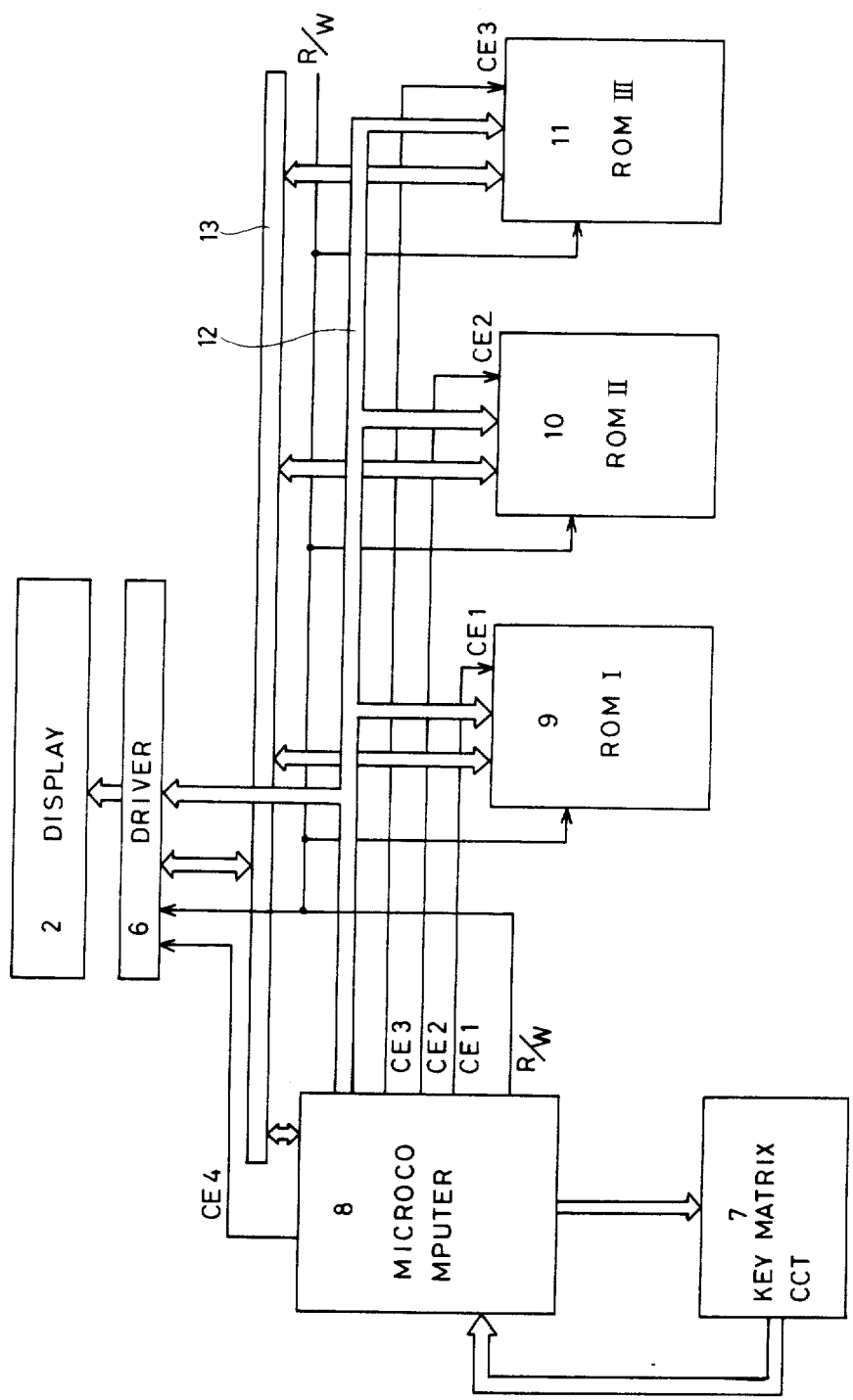
FIGS. 2, 3(a) and 3(b) show a block diagram of a control circuit that, may be implemented within the translator as shown in FIG. 1.

FIG. 2 shows a block diagram of a control circuit implemented in the translator according to the present invention. The circuit comprises the indicator 2, a driver 6, a key matrix circuit 7, a microcomputer 8, ROM I 9, ROM II 10, and ROM III 11. The circuit 7 functions for the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferred embodiment of the present invention, each one of the ROM's 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it can not be removed from the translator for exchange purposes. However, it is preferable that each of the ROM II 10 and ROM III 11 can be removed from the translator and replaced by another type of ROM as module ① or ② to permit the user to translate between the mother language (here English) and additional foreign languages such as French or German (see FIG. 1).

Each of the ROM's 9 to 11 is connected to the microcomputer 8 through an address bus 12 and a data bus 13. Chip selection signals $CE_1$, $CE_2$, and $CE_3$ are developed by the microcomputer 8 to select one of the ROM's 9 to 11. Words and/or sentences are applied to the microcomputer 8 from the selected ROM. $CE_4$ indicates a chip selection signal for the driver 6. "R/W" indicates a read/write signal for selecting a read or write operation.

Figure 3A:
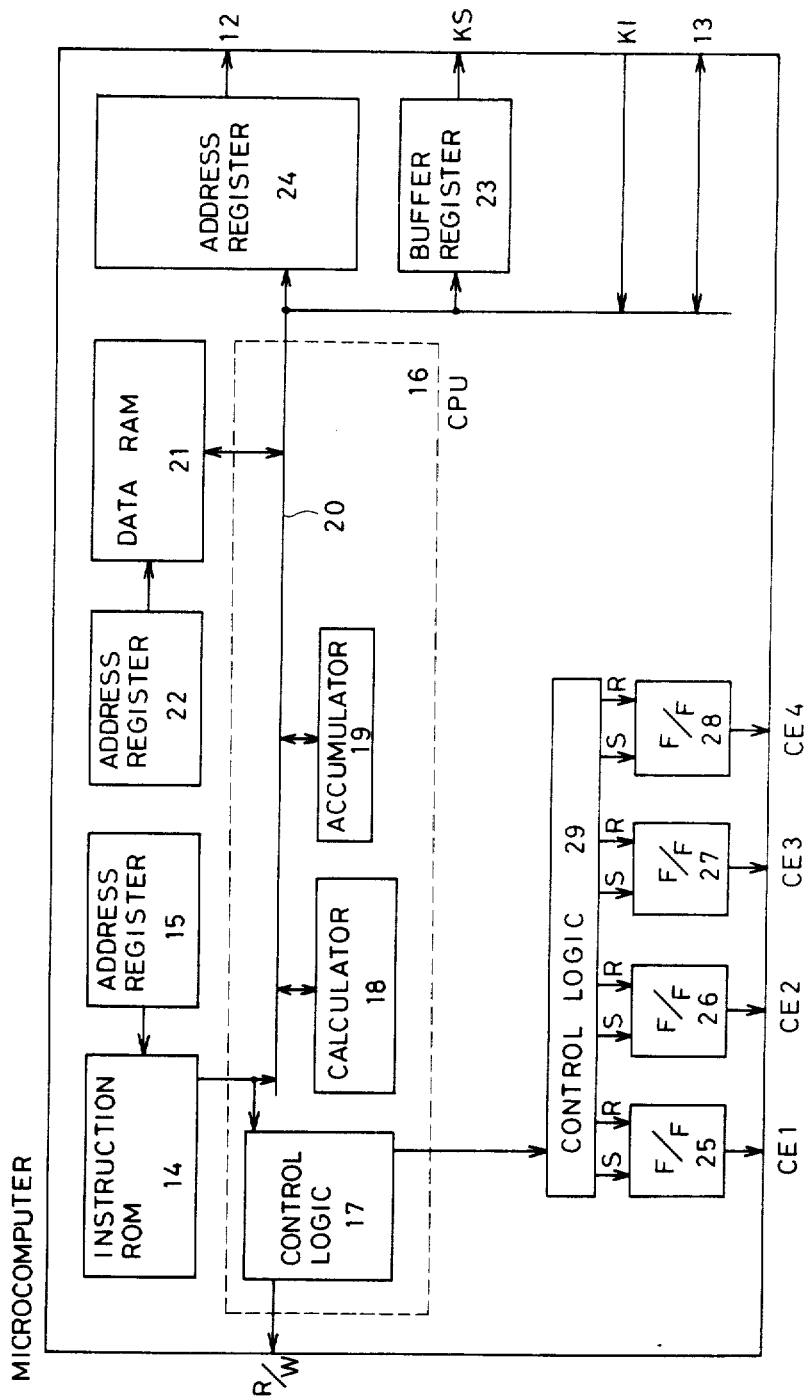

FIG. 3(a) shows a block diagram of the microcomputer 8 of FIG. 2. An instruction ROM 14 stores a number of kinds of instruction, each of which is used to perform a specific operation by the translator and is, preferably, in coded format. As the address of a ROM address register 15 is, in turn, advanced, the ROM 14 provides a specific instruction. The specific instruction is applied to a CPU 16 so that the CPU 16 understands its instruction to provide the selected operation.

The CPU 16 comprises a control logic 17, a logic calculator 18, and an accumulator 19. An internal data bus is indicated by the reference numeral 20. Data RAM 21 is provided for preliminarily containing data used for the translator and for functioning as a conditional flip-flop used for a branch in a program operation. Data from the CPU 16 is stored in a specific location within the data RAM 21 which location is selected by a RAM address register 22. The data stored in such a location within the RAM 21 is applied to the CPU 16.

Reference numeral 23 represents an output buffer register for outputting key strobe signals KS in turn to the key matrix circuit 7 so that the output of this circuit 7 is applied to the CPU 16 as key input signals KI. Reference numeral 24 indicates an address register for selecting the address of the external memory including the ROM's 9 to 11 and a RAM circuit within the driver 6. The output of the address register 24 is fed through the address bus 12. Control of the address register 24 to select increment or decrement and a certain address is carried out by the CPU 16. Since the CPU 16 is coupled to the data bus 13 as shown in FIG. 2, transmission of the data between the CPU 16 and the external memory is accomplished by use of the data bus 13. The direction of transmission of the data between them is defined with the read/write signal R/W.

Each of flip-flop circuits 25 to 28 is set or reset by a control logic 29. The control logic 29 is controlled by the CPU 16. The output of each of the flip-flops 25 to 28 is referred to as chip selection signals $CE_1$ to $CE_4$, respectively.

Figure 3B:
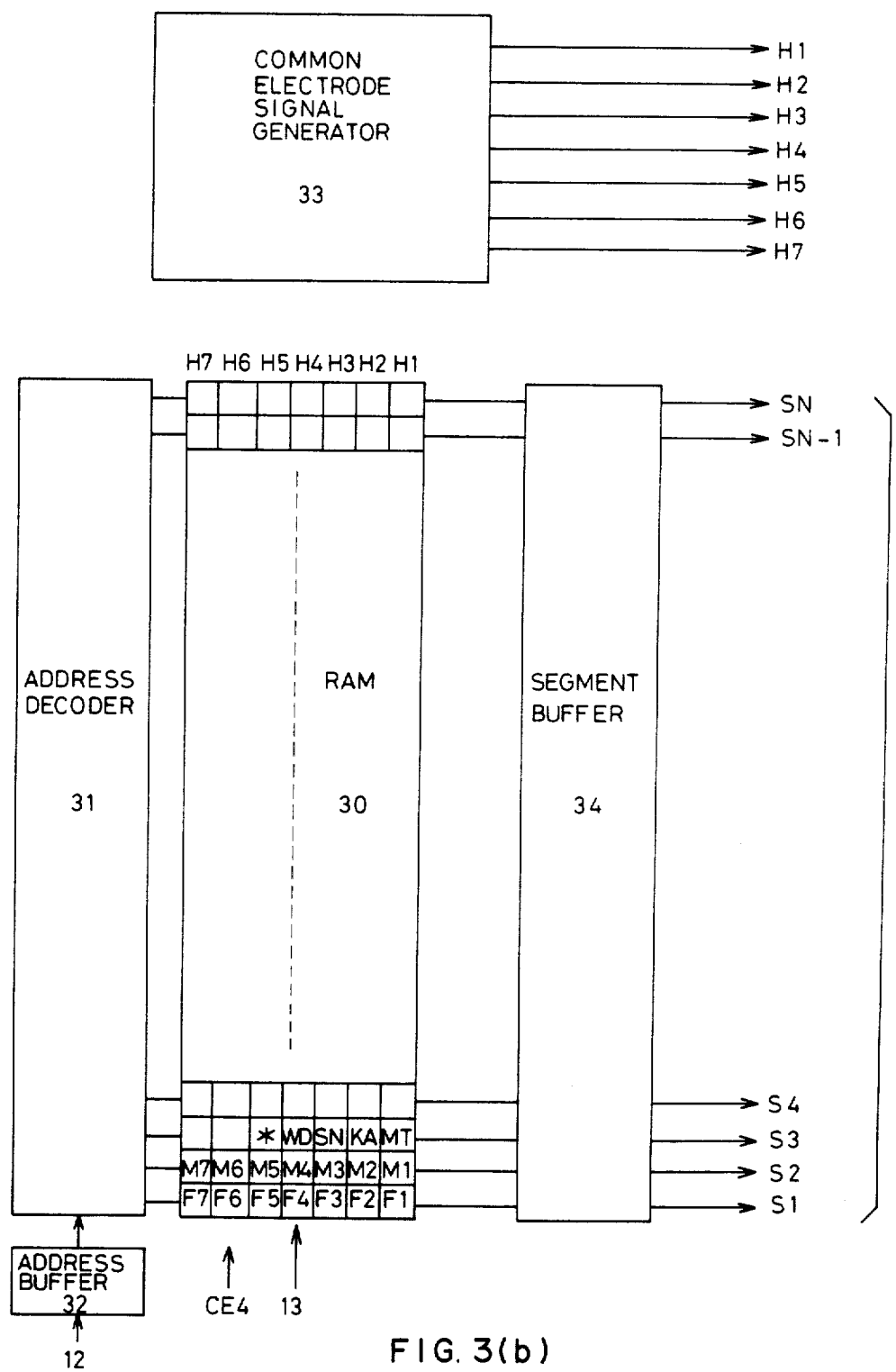

FIG. 3(b) shows a block diagram of the driver 6 of FIG. 2. According to a preferred embodiment of the present invention, the indicator 2 comprises a liquid crystal display. The character indicator 3 is formed as a 5×7 dot matrix in a single digit. One symbol of the language indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is made dark.

In FIG. 3(b), $S_1$, $S_2$ and $S_3$ refer to segment electrode signals used for illuminating symbols. $S_4$ to $S_N$ refer to segment electrode signals used for indicating characters. $H_1$ to $H_7$ represent common electrode signals. $M_1$ to $M_7$ represents a symbol " " of the language indicator 4, the symbol indicating the mother or original language which is to be translated with the translator of the present invention. $F_1$ to $F_7$ represent another symbol " " of the same indicator 4, this symbol indicating the foreign or the translated language into which the translator of the present invention translates a selected word or words from the original language.

Further in FIG. 3(b), reference numerals 1 to 7 when used as suffixes are intended to refer to English, German, Japanese and French, etc., respectively. MT indicates a multivocal word. KA indicates a Japanese "Katakana" letter. SN represents a sentence while WD represents a word. A star "*" indicates that each of words represented in the mother or original language is translated into each of corresponding words represented in the foreign or translated language while the grammatical correction and modification meeting with that foreign language is not carried out.

The driver 6 provides display signals to the indicator 2 when display data is produced by the microcomputer 8 to apply them to the RAM 30. Since the driver 6 is of otherwise conventional design, further description thereof is omitted.

Figure 4:
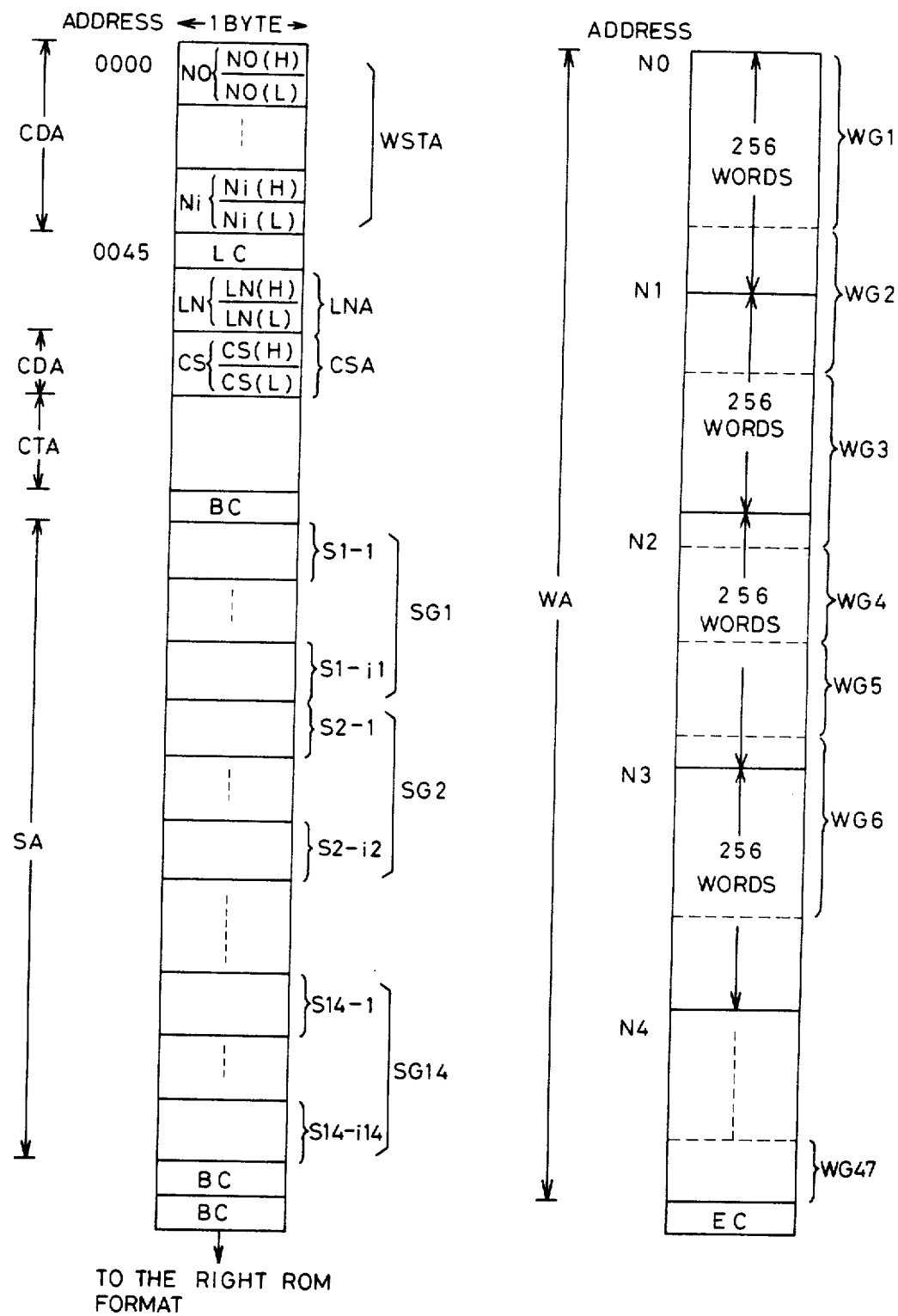
FIG. 4 shows a format of a ROM for storing words, the ROM being connected in the circuit of FIG. 2.

FIG. 4 shows a format in which a great number of words are stored in each of the ROM's 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input word and one or words stored in one of the ROM's is to be detected, the input word is changed to codes inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories in each of which a number of words are ordered. In FIG. 4, a word category "n" is referred to WGn. Sentences are formed by a combination of a plurality of stored words. These sentences are classified in 14 categories, in each of which a number of sentences are ordered. In FIG. 4, a sentence category "m" is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1-1

| The serial number of the category | corresponding key | the name of the category | category symbol |
|---|---|---|---|
| 1 | "ra" or "c" | airplane |  |
| 2 | "ri" or "I" | customs |  |
| 3 | "ru" or "A" | transporting machine |  |
| 4 | "re" or "J" | at hotel |  |
| 5 | "ro" or "S" | in restaurant |  |
| 6 | "m" or "T" | sight seeing |  |
| 7 | "mo" or "U" | amusement |  |
| 8 | "ho" or "V" | shopping |  |
| 9 | "no" or "W" | direction |  |
| 10 | "to" or "X" | business |  |
| 11 | "so" or "Y" | service |  |
| 12 | "ko" or "Z" | conversation |  |
| 13 | "O" or "." | at medical practitioner's Office |  |
| 14 | "SPC" or "o" | emergency |  |

Each category for the words may contain 256 words. A first word address table region WSTA contains a first address referred to as $N_0, N_1, N_2, \ldots N_i$ in FIG. 4. This first address is related to a location in which a first code or first compressed code for representing the first word is stored. In accordance with a specific example of the present invention, each address is represented by two bytes. Each first address is separated into an upper byte referred to No(H) to Ni(H) and a lower byte referred to No(L) to Ni(L). The first word address table region is used to shorten retrieval time for a specific word.

CS is used to refer to a first sentence address CS(H) and CS(L) which is stored in a first sentence address region CSA. LNA indicates a memory location for storing a serial number of a word indicating the a specific language as referenced by LN of LN(H) and LN(L). More particularly, as the ROM storing English words is concerned, a word "English" is necessarily contained in that ROM. In such a case, the serial number of the word "English" in the ROM is LN starting from the first word of the same kind of word group.

Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4, LC indicates a language code in which the first four bits indicate a field of language stored in the ROM and the last four bits the kind of language stored in the ROM. In particular, there may be present a ROM for storing words oriented to economy, engineering or medicine, respectively. Information representing such a field is stored in LC. The last four bits correspond to each language as follows:

TABLE 1-2

| The last four bits | the language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | a tongue |
| 0 1 1 0 (6) | another language |
| 0 1 1 1 (7) | a further language |

In FIG. 4, BC, "11111111" is a boundary code and EC "11111111" is an end code of the ROM.

FIGS. 5(a) and 5(b) show specific combinations of the mode selector 35 and category key switches, and display in the character indicator 3. FIG. 5(a) shows conditions when the mode selector 35 is placed in the sentence selection mode "Sen.". FIG. 5(b) shows conditions when it is placed in the word selection mode "Word".

FIG. 5(a)—(a):

A specific display is enabled when the mode selector 35 is placed in the "Sen." mode. This specific display announces that the operator should actuate one of the category key switches. This specific display is promptly displayed in which case input of information is awaited. The prompt display can be enabled as indicated in FIG. 5(a)—(b).

FIG. 5(a)—(c):

When a specific category key related to an "in restaurant" category is actuated, a first sentence in the sentences grouped in the "in restaurant" category is displayed as shown in FIG. 5(a)—(d). The first sentence is stored as the head sentence in the ROM. A mark " " is displayed in FIG. 5(a)—(c) for indicating that the translator is placed in the retrieval operation.

FIG. 5(a)—(e):

When the specific category key related to the "in restaurant" category is further actuated, a second sentence in the sentences grouped in the "in restaurant" category is displayed.

FIG. 5(a)—(f):

In place of the second actuation of the specific category key, the search key 42 can be actuated for displaying the second sentence in the category selected. When the search key 42 is operated after the second actuation of the specific category key, a third sentence in the category selected is displayed as FIG. 5(a)—(f) shows.

FIG. 5(a)—(g):

When another category key related to an "airplane" category is operated, a first sentence belonging to that category is displayed.

Thus, during the category selection mode, the category keys are individually operated independent of any category mode previously selected. Once a specific category selection key is actuated during any category mode previously selected, a category mode selected by the specific category selection key is enabled. In response to the actuation of the specific category selection key, the first word or sentence in the words or sentences grouped in that category is outputted at once.

FIG. 5(a)—(h):

The sentence as displayed by the operation of FIG. 5(a)—(g) is translated into English by actuating the translation key switch 44.

FIG. 5(b)—(i):

The mode selector 35 is placed in the "Word" mode.

FIG. 5(b)—(j):

The word key switch 43 ("WD") is actuated to enable the prompt display.

FIG. 5(b)—(k):

A specific category selection key related to the "airplane" category is actuated, so that the first word in the words grouped as the "airplane" category is displayed.

FIG. 5(b)—(l):

When the category selection key relating to the "airplane" category is again actuated, a second word in the same category is retrieved and displayed.

FIG. 5(b)—(m):

The search key 42 ("SRC") can be actuated to read-out another word in the same category.

FIG. 5(b)—(n):

The word displayed by the operation of FIG. 5(b)—(m) is translated by actuating the translation key 44 ("TRL").

FIG. 5(b)—(o):

When another category selection key related to the "sight seeing" category is actuated, a first word in the words grouped as the "sight seeing" category is read out.

Thus, the 14 category selection keys accompanied by the category symbols 46 are actuated during illumination of the symbol indicator 5 to select the categories.

Figure 7:
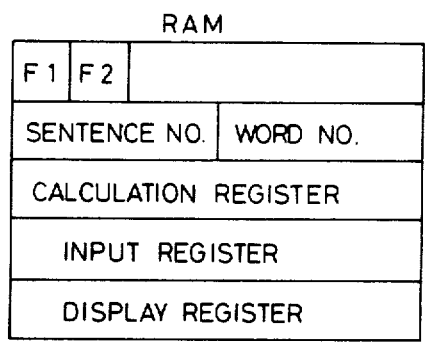
FIG. 7 shows a circuit arrangement of a RAM connected to the circuit of FIG. 3(a)

FIG. 7 shows a circuit arrangement of the data RAM 21 of FIG. 3(a). The data RAM comprises flip-flops $F_1$ and $F_2$, a memory circuit for storing the numbers of the sentence and the word, a calculation register, an input register and a display register.

The flag $F_1$ is set when the sentence selection mode ("Sen.") is selected. It is reset when the word selection mode ("word") is selected. The flag $F_2$ is set when the word key 43 ("WD") is actuated. The memory circuit is provided for storing the number of the sentence which is now being read-out. The memory circuit is provided also for storing the number of the word which is now being read-out. The calculation register functions to cause operation. The input register acts to receive input information. The display register acts to enable display.

Figure 6:
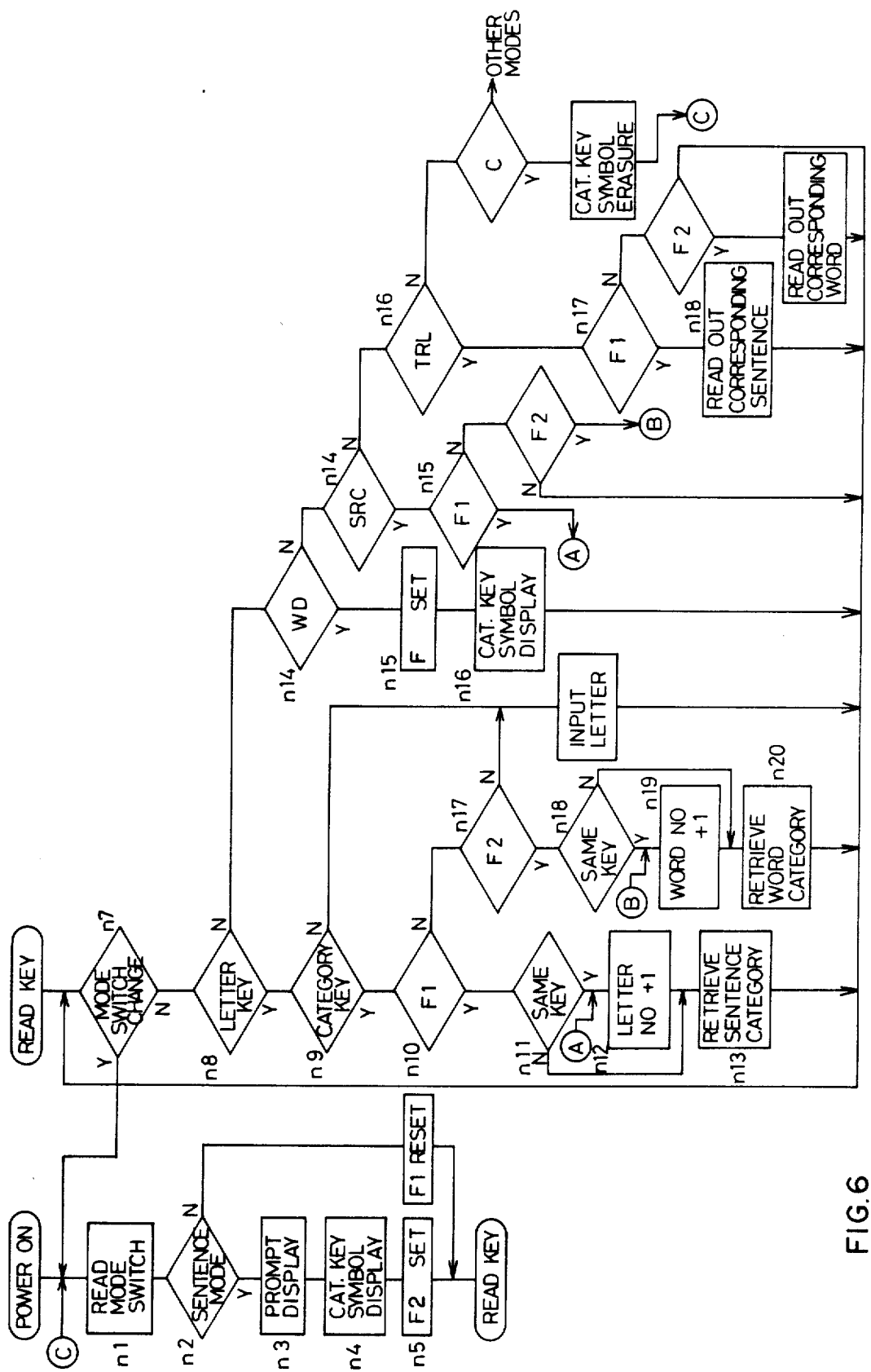
FIG. 6 shows an operational flowchart of the translator.

FIG. 6 shows an operational flowchart of the translator according to the present invention.

Electric power is conducted in response to actuation of the mode selector 35 into the "Word" mode or the "Sen." mode. The following steps are conducted.

$n_1$:

The "Word" mode or the "Sen." mode is read in.

$n_2$:

It is detected that the "Sen." mode is selected.

$n_3$:

The prompt display as shown in FIG. 5(a)—(a) is enabled.

$n_4$:

The symbol indicator 5 in FIG. 1 is illuminated. The illumination of the symbol indicator 5 means that every of the category selection keys can be operated to select every of the categories.

$n_5$:

When the "Sen." mode is selected, $n_5$ is executed in which the flag $F_1$ in the data RAM 21 of FIG. 7 is set. Thereafter, key inputted information is read-in.

$n_6$:

When the "Word" mode is selected, $n_6$ is executed in which the flag $F_1$ is reset. Thereafter, the key inputted information is read-in.

Therefore, by detecting whether the flag $F_1$ is set or reset, the "Sen." mode or the "Word" mode can be discriminated.

$n_7$ to $n_{10}$:

When a specific category selection key related to the "in restaurant" category is operated, the key inputted information is read-in and detected.

$n_{10} \rightarrow n_{11} \rightarrow n_{13}$:

When the "Sen." mode is selected so that the flag $F_1$ is set, the first sentence in the "in restaurant" category is outputted in $n_{13}$. $n_{11}$ is executed whether the immediately preceding key is the same as the key now being actuated. This comparison can be enabled by storing codes corresponding to the category selection keys in a buffer circuit and comparing the codes. Thus, the sentence as shown in FIG. 5(a)—(d) is displayed. When the translator is in the retrieval mode, the retrieval mark " " is displayed.

$n_{12}$:

When the same category selection key is again operated, $n_{12}$ is selected to advance the number of the sentence by one within the data RAM 21 of FIG. 7. The second sentence corresponding to the now-advanced number of the sentence is retrieved and displayed in $n_{11} \rightarrow n_{12} \rightarrow n_{13}$, as shown in FIG. 5(a)—(d).

$n_{14} \rightarrow n_{15} \rightarrow$ A $\rightarrow n_{12} \rightarrow n_{13}$:

When the search key 42 ("SRC") is actuated, the condition of the flag $F_1$ is detected. When the "Sen." mode is selected, the third sentence in the same category is read-out.

$n_{16} \rightarrow n_{17} \rightarrow n_{18}$:

When the translation key 44 ("TRL") is operated, a translated sentence corresponding to the now-displayed sentence is outputted from the memory.

The system of FIG. 2 has the capability of translating three languages from one to another. A specific type of ROM stores a great number of words and sentences as is shown in FIG. 4. Each of the stored words and sentences corresponds to a respective one of the translated words and sentences in the other ROM's. This correspondence is assured by the numbers of words and sentences which are in common between the ROM's. For example, a specific sentence "GOOD MORNING." is assumed to be stored as the 100th sentence in a ROM that stores data corresponding to English words and sentences.

The corresponding Japanese sentence is stored as the 100th sentence in another type of ROM that is related to Japanese. A further corresponding German translated sentence "GUTEN MORGEN." is stored similarly as the 100th sentence in a further type of ROM that is related to German.

Similarly, the same technique can be applied in connection with words so that a specific word ordered at a particular serial number in one ROM corresponds to its translated word ordered at the like serial number in another ROM.

Conducting the translation by the translator lies in finding the serial number of a word or a sentence in the mother language ROM and, accordingly thereafter, in detecting the translated word or sentence having the like serial number in the foreign language ROM.

The translation operation comprises the following steps:

(i) the first step: selecting a specific ROM of the mother language;

(ii) the second step: detecting the serial number of a desired word or a sentence in the thus selected ROM;

(iii) the third step: selecting another specific ROM of the selected foreign language; and (iv) the fourth step: detecting the translated word or sentence having the like serial number in another ROM.

$n_7 \rightarrow n_1 \rightarrow n_2 \rightarrow n_6$:

When the "Word" mode is selected by the mode selector 35, $n_7$ is executed to detect the change from the "Sen." mode to the "Word" mode in $n_7$. $n_1 \rightarrow n_1 \rightarrow n_2 \rightarrow n_6$ is conducted to thereby reset the flag $F_1$.

$n_{14}$:

The actuation of the word key 43 ("WD") is detected in this step.

$n_{15}$:

The flag $F_2$ is set in this step so that the translator is placed in the "Word" mode.

$n_{16}$:

The symbol indicator 5 is illuminated.

$n_{10} \rightarrow n_{17} \rightarrow n_{18} \rightarrow n_{20}$:

A specific category selection key related to the "airplane" category is operated to thereby output the first word in the "airplane" category in $n_{10} \rightarrow n_{17} \rightarrow n_{18} \rightarrow n_{20}$.

$n_{18} \rightarrow n_{19} \rightarrow n_{20}$:

The same category selection key is further operated to thereby output the second word in the "airplane" category. The second word can be retrieved and outputted by actuating the search key switch 42 ("SRC"). FIG. 5(b) shows these operations.

Figure 8:
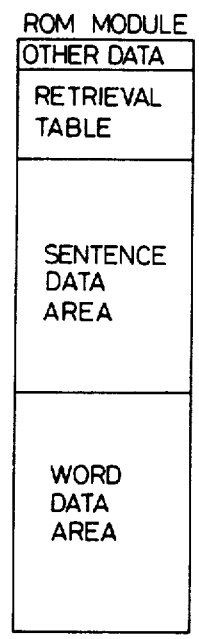
FIG. 8 shows a circuit arrangement of the ROM of FIG. 4.

FIG. 8 shows a circuit arrangement of the ROM of FIG. 4. As stated in FIG. 4, the ROM includes circuits for a retrieval table, sentence data, word data and other data.

As stated above, in accordance with the present invention, each of the category selection key switches can be actuated individually, independent of the category now selected to thereby output the words and the sentences, subsequently. The search key switch 42 ("SRC") can be operated to output the words and the sentences in the category selected.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator wherein a first word or words represented in a first language are entered to obtain a second word or words represented in a second language equivalent to the first word or words, comprising:

memory means for storing a plurality of word arrangements in the first language, which work arrangements comprise at least one word and which are grouped within the memory means into a plurality of categories;

selection means for selecting a category from among the plurality of categories, said selection means including a single key switch for each category with a symbol thereon corresponding to that category; and access means responsive to the selection means for addressing the memory means to retrieve and output each of the word arrangements stored in the memory means in the selected category, each of the word arrangements being outputted individually and serially by a single operation of the selection means.

2. An electronic translator according to claim 1, wherein the selection means further includes keyboard means for inputting information in alpha-numeric characters.

3. An electronic translator according to claim 1, further comprising an indicator means for indicating selection of a category from which the plurality of word arrangements in the category are outputted.

4. An electronic translator according to claim 1, wherein the plurality of arrangements of words stored in the memory means include both individual words and sentences.

5. An electronic translator according to claim 4, wherein the plurality of arrangements of words are further grouped within the memory means into words and sentences, and further comprising a mode selecting means for selecting between a word mode and a sentence mode, where the words grouped in a selected category may be retrieved and outputted when the selecting means is in the word mode and the sentences grouped in a selected category may be retrieved and outputted when the selecting means is in the sentence mode.

6. An electronic translator according to claim 1, further comprising translation means for retrieving and outputting the word or words in the second language equivalent to any selected word arrangement retrieved and outputted in the first language.

7. An electronic translator according to claim 1, further comprising display means for displaying all word arrangements outputted.

* * * * *